United States Patent [19]
Eccleston

[11] Patent Number: 5,352,028
[45] Date of Patent: Oct. 4, 1994

[54] CONTROLLER FOR ELECTRIC BRAKING SYSTEMS

[75] Inventor: Larry Eccleston, Marshall, Mich.

[73] Assignee: Tekonsha Engineering Company, Tekonsha, Mich.

[21] Appl. No.: 807,115

[22] Filed: Dec. 13, 1991

Related U.S. Application Data

[63] Continuation-in-part of Ser. No. 563,505, Aug. 7, 1990, Pat. No. 5,149,176, which is a continuation-in-part of Ser. No. 390,617, Aug. 7, 1989, Pat. No. 5,050,937.

[51] Int. Cl.$^5$ ............................................. B60T 13/74
[52] U.S. Cl. ..................................... 303/20; 303/24.1
[58] Field of Search ........................ 303/3, 7, 20, 24.1, 303/15, 92; 188/112 R, 112 A, 181 A

[56] References Cited

U.S. PATENT DOCUMENTS

| | | | |
|---|---|---|---|
| 2,228,631 | 1/1941 | Kuiper | 308/3 |
| 3,601,794 | 9/1968 | Blomenkamp | 340/62 |
| 3,738,710 | 6/1973 | Pokrinchak et al. | 303/20 |
| 3,780,832 | 12/1973 | Marshall | 188/3 R |
| 3,908,782 | 9/1975 | Lang et al. | 180/103 |
| 3,909,075 | 9/1975 | Pittet, Jr. et al. | 303/24 |
| 3,953,084 | 4/1976 | Pittet, Jr. et al. | 303/24.1 |
| 3,955,652 | 5/1976 | Nilsson et al. | 188/112 |
| 3,967,863 | 7/1976 | Tomecek et al. | 303/24 |
| 3,981,542 | 9/1976 | Abrams et al. | 303/20 |
| 3,981,544 | 9/1976 | Tomecek et al. | 303/24.1 |
| 4,030,756 | 6/1977 | Eden | 303/24 |
| 4,050,550 | 9/1977 | Grossner et al. | 188/112 |
| 4,084,859 | 4/1978 | Bull et al. | 303/106 |
| 4,721,344 | 1/1988 | Frait et al. | 303/20 |
| 4,726,627 | 2/1988 | Frait et al. | 303/20 |
| 4,849,655 | 7/1989 | Bennett | 303/24.1 |
| 4,856,850 | 8/1989 | Aichele et al. | 303/20 |
| 5,032,821 | 7/1991 | Domanico et al. | 340/440 |

OTHER PUBLICATIONS

"Linear Integrated Circuits," by Unitrode Integrated Circuits.

*Primary Examiner*—Matthew C. Graham
*Attorney, Agent, or Firm*—Price, Heneveld, Cooper, DeWitt & Litton

[57] ABSTRACT

An improved electronic controller for electrically actuated vehicle brakes includes a triple sloping integrator for providing a control signal to a pulse with modulator controller. The circuit further includes a protection circuit for protecting electrical devices in the electronic controller from an inadequate electrical ground. Where the electronic controller includes an inertial sensor, the electronic controller includes a current control device for controlling the current flow through the inertial sensor. The electronic controller also includes a device for disabling the inertial sensor.

13 Claims, 2 Drawing Sheets

CONTROLLER FOR ELECTRIC BRAKING SYSTEMS

CROSS-REFERENCED TO RELATED APPLICATIONS

This application is a continuation-in-part of prior application Ser. No. 07/563,505, filed Aug. 7, 1990, now U.S. Pat. No. 5,149,176 which is a continuation-in-part of prior application Ser. No. 07/390,617, filed Aug. 7, 1989, now U.S. Pat. No. 5,050,937, the disclosures of which are incorporated herein by reference.

BACKGROUND OF THE INVENTION

This invention relates to controllers for electrically-actuated braking systems such as those used to apply the brakes on towed vehicles, i.e., trailers, in response to commands from the towing vehicle. More particularly, the invention relates to electronic controllers for braking systems of the general type just noted which operate in response to inertial sensors and/or manually-actuated switches, or the like, to energize electric brake-actuation components of such systems in a particular controlled manner.

Substantial effort and progress continues toward the goal of providing more stable and more responsive electronic brake system controllers which apply drive excitation to the electromagnetic brake shoe actuators located at the trailer wheels. A number of difficulties have been encountered in providing electronic controllers for such towed vehicle electromagnetic brake shoe actuators. For example, continuous braking excitation is likely to promote trailer brake lockup, and that is a most undesirable event since it brings about a marked decrease in braking efficiency and loss of operator control. One technique for avoiding continuous braking excitation involves applying pulsating excitation to the electromagnetic actuators. Such pulsating excitation systems may be in the form of a constant pulse-width applied at varying frequencies or a varying pulse-width applied at a constant frequency. However, variable frequency systems usually include some actuation frequencies which unfortunately complement, or reinforce, resonant frequencies in the vehicle braking system (whether mechanical, electromechanical or electromagnetic in nature) with the result being instability, brake chatter, etc. Pulse-width-modulated (variable-pulse-width) constant-frequency systems sometimes utilize operational frequencies which have such adverse characteristics, and are likely to have other disadvantages as well.

One common incident of practically all state-of-the-art electronic brake-system controllers is the fact that they utilize, and in fact require, interconnection with the vehicle brake light circuit. However, where the brake light signal is required to activate the towed vehicle brakes, mechanical or electrical failure in the brake light circuit entirely extraneous to actual towing vehicle performance could result in the loss of all trailer braking. Furthermore, with the increasing sophistication of modern-day vehicles, the brake light circuit has grown increasingly complex, since it is now directly intercoupled with such other systems as electronic cruise controls, antiskid braking systems, etc., and as a result each such system becomes more interdependent and subject to failure or malfunction caused by the others. Additionally, trailer brake controllers are after-market devices which are installed after the tow vehicle leaves the factory. Thus, with the increasing complexity of vehicles and systems related to the brake light actuation system, it becomes increasingly more difficult, as well as more risky and potentially damaging, to physically breach the factory-installed wiring in order to interconnect the brake light actuation system with after-market devices.

Thus, it is desirable to provide electronic brake controllers for towed vehicles which are relatively easy to install without risk of damage to the electronic controller or the towing vehicle factory-installed wiring. A particularly advantageous system is disclosed in U.S. Pat. No. 5,090,937, wherein an electronic controller for actuating the brake system is independent of the towing vehicle brake light actuation system. While the system of this patent overcomes many of the problems of the prior art, and provides effective towed vehicle braking, it remains desirable to provide even more improved electronic controllers for electric brake systems.

One difficulty encountered in providing electronic controllers is accommodating different towed vehicle weights, as well as different towed vehicle electromagnetic brake system characteristics. Heavy towed vehicles require more braking current to have the same brake response as a lighter trailer. Thus, when different towed vehicles are connected to the electronic controller, the braking system will provide a different "feel" to a towing vehicle operator. Additionally, the rate at which the brakes are actuated, as set at the factory, may be different from the rate at which an operator would like them to be actuated. While known electronic controls allow a vehicle operator to select the maximum effective current applied to the electromagnetic brake actuator, they do not allow the operator to independently vary the rate at which current is applied to the electromagnetic brake actuator. Finally, different electromagnetic brake shoe actuators require different current magnitudes to initiate towed vehicle braking.

In addition, electronic controllers for electric brake systems lack adequate protection against incorrect connection of the electronic controller to the towing vehicle electrical system. In particular, the electronic controller may not be adequately grounded when it is installed. For example, where an operator mounts the controller on a vehicle dashboard, the installer may connect the controller to the dashboard for purposes of providing a ground. However, when the vehicle in which the controller is mounted is jarred, the ground connection provided by the vehicle through the dashboard may be interrupted such that the controller is temporarily disconnected from the ground. When known electronic controllers are disconnected from the ground, the voltage within the controller can increase such that it exceeds the voltage capacity of the controller integrated circuits. As a result, the integrated circuits in the controller may be destroyed.

Another difficulty encountered in electronic brake controllers is providing sufficiently rapid brake actuation without causing brake lock-up. If the effective current applied to towed vehicle brakes is increased too rapidly, the brakes may lock up. On the other hand, if the brake current is applied too gradually, the brakes may not be fully activated in a timely manner, such that brake actuation is sluggish. An additional difficulty is providing a controller which avoids the above problems, yet releases the brakes rapidly when the brake actuation signal is removed, to prevent continued actuation of the towed vehicle brakes.

BRIEF DESCRIPTION OF THE FEATURES OF THE PRESENT INVENTION

The present invention effectively resolves many, indeed most of the problems described above which characterize prior art controllers. In accordance with the invention, new and more effective controllers are provided through the combined effect of a number of distinct features which vary in both concept and implementation from those found in prior art devices, and which combine synergistically to provide electronic brake controllers which are more effective and better protected than those utilized heretofore.

In one aspect of the invention, an electronic controller for electrically actuated vehicle brakes includes a device for producing control signals proportionally representative of the desired extent of vehicle braking and a device for producing pulses of current whose effective magnitude is proportional to the magnitude of said control signals, for correspondingly energizing said vehicle brakes. The electronic controller includes a device for applying and gradually increasing the effective magnitude of the current pulses produced for a given value of control signals, which device increases the effective magnitude of current pulses produced at a first rate until a threshold level is reached and increases the effective magnitude of the current pulses produced for the given value of control signals at a second rate after the threshold is reached.

In another aspect of the invention the electronic controller includes a device for adjusting the maximum current applied to the brakes and a device for adjusting the rate at which the current is applied to the brakes. In yet another aspect of the invention, the electronic controller includes at least one protection device adapted to protect the controller against voltages which would damage the controller if the controller is not adequately grounded. In one other aspect of the invention, the electronic controller includes an inertial sensor, a manual brake-actuation device and a device for disabling the inertial sensor.

Some of the more salient attributes of the present invention include a controller providing independent adjustment of the rate at which current is applied to the electromagnetic brake shoe actuators, allowing an operator to adjust the controller for different towed vehicles; rapid brake actuation initially followed by a gradual increase in the effective current applied to the electromagnetic brake shoe actuators responsive to a certain brake signal; protection against over-voltages which may occur if the electronic controller is inadequately grounded; and where an electronic controller including an inertial sensor is required to be activated responsive to signal activation, and the controller includes a manual brake-actuation device, a controller is provided which prevents regenerative braking caused by the inertial sensor when the manual brake-actuation device is utilized to activate towed vehicle braking.

These and other features and attributes of the invention will become more apparent after contemplation of the ensuing more detailed description, particularly when considered with and in light of the accompanying drawings.

DESCRIPTION OF THE PREFERRED EMBODIMENTS

Figure 1:
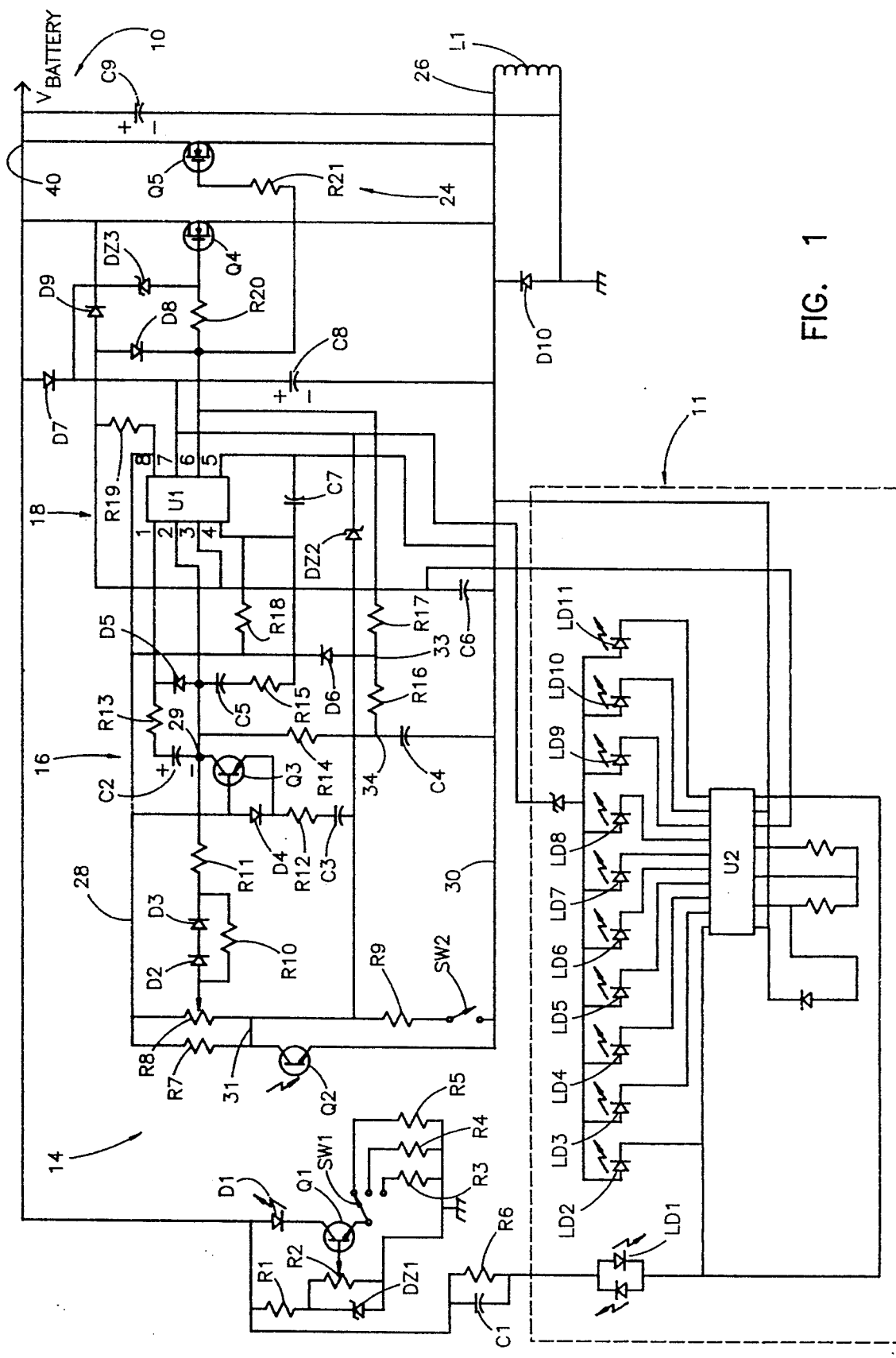
FIG. 1 is a schematic circuit diagram showing a first embodiment of an electronic controller in accordance with the invention.

Referring now to the drawings and the illustrative embodiments depicted therein, a first controller circuit is shown in FIG. 1. The upper portion of the circuit, designated generally by the numeral 10, comprises the braking current control portion of the circuit, while the lower portion, generally designated by the numeral 11, comprises the braking current display-generation means. Referring first to the braking current control portion of he circuit 10, the control circuit generally includes a detection and control portion 14 shown at the left, and proceeding toward the right, includes a triple-slope integrator section 16, a variable-pulse-width modulator 18, which includes an integrated circuit U1 described in more detail hereinafter, and an output stage 24 comprising MOSFET elements, which may be single or double in form. As shown, he output stage 24 has an output conductor 26 which comprises connection to the towed vehicle (trailer) brake actuators, here symbolized by the large inductive winding labelled "L1," it being understood that in actual practice here will be a number of individual such inductances in parallel, each comprising an electromagnet which actuates one set of brakes at one wheel, all wheels usually being controlled simultaneously and in a substantially identical fashion.

With first reference to the detection and control portion 14 of the circuit 10, elements D1 and Q1 symbolize the signal-generating portions of an inertial sensor. The inertial sensor is most preferably in accordance with that described in co-pending application Ser. No. 07/390,280 filed May 24, 1989, now U.S. Pat. No. 4,058,960, although the mass of the accelerator in the inertial sensor may be decreased from the mass heretofore utilized in such devices to increase the deceleration span of the inertial sensor. While an appropriate signal could, of course, be provided by other than electro-optical elements, the latter do provide a preferred embodiment of the invention, particularly in combination with the inertial sensor of the co-pending application just described. Thus, in a preferred embodiment, element D1 comprises an infrared light-emitting diode, and element Q1 comprises a corresponding phototransistor, both of which may desirably be implemented by use of Motorola components, MLED71 and MRD701, respectively.

As will be understood, the basic purpose of circuit portion 14 is to provide an analog control signal corresponding in magnitude to the extent of trailer braking desired, and thus an integral portion of circuit 14 is a transistor Q1 connected to diode D1 and to a variable impedance device 15. A resistor R1 and a potentiometer R2 are connected in series between a towing vehicle battery and ground. The base of transistor Q1 is connected to the wiper of potentiometer R2, which may be a 5 KOhm potentiometer, which is connected in parallel with a Zener diode DZ1, which may be a 5.6 volt Zener diode. The potentiometer is used to provide a voltage to the base of transistor Q1, such that it is biased on by the towing vehicle battery. In a preferred embodiment of the invention, the variable impedance device includes a manually actuated switch SW1, by which the towing vehicle operator may manually adjust the current through transistor Q1 and diode D1. In the most preferred embodiment in accordance herewith, switch SW1 connects the emitter of transistor Q1 to one of three different impedance elements R3, R4 and R5. However, a potentiometer could also be utilized to adjust the emitter impedance of transistor Q1. Transistor Q1 may be a commercially available NPN transistor identified as No. PN2222. Impedance elements R3–R5 may be 100 Ohm, 150 Ohm, and 200 Ohm resistors, respectively.

Circuit portion 14 also includes a manual brake actuation device, such as a switch SW2, by which the towing vehicle operator may manually initiate measured braking effects on the trailer whenever desired, apart from the operation of the towing vehicle brakes and the corresponding inertial effects. In the most preferred embodiment in accordance herewith, switch SW2 comprises a membrane-type "touch pad" switch of an appropriate commercially available type. However, a potentiometer or other known manual brake actuation device could be utilized. Both the inertial sensor components and the manual actuated components are effectively coupled between mutually shared supply and ground conductors 28 and 30, respectively, through a potentiometer R8 and a resistor R7, respectively. An interconnecting line 31 extends between the lower voltage side of potentiometer R8 and resistor R7. As will be understood, potentiometer R8 comprises a gain control for the entire control circuit 10, since it acts to set the current level injected into input pin 2 of integrated circuit U1, as described in greater detail hereinafter. Potentiometer R8 may be a 50 KOhm potentiometer.

The triple-slope integrator 16 basically comprises a capacitor C3, a capacitor C2, a resistor R12, a resistor R13, a diode D4, and a transistor Q3. capacitor C3 is charged through resistor R12 and diode D4 when switch SW2 is closed, due to the polarity of diode D4, at a charge rate set by resistor R12 and capacitor C3. A capacitor C2 is also charged when switch SW2 is closed or transistor Q2 conducts current responsive to light emitted by the aforementioned diode D1 which is part of the inertial sensor. Capacitor C2 controls the gain of an internal amplifier of integrated circuit U1, as described in greater detail hereinafter. R12 may be a 68 KOhm resistor and C3 may be a 4.7 uF capacitor. When switch SW2 is released, the potential on capacitor C3 is applied to the emitter of transistor Q3, the base of which is attached to the supply conductor 28, such that current then flows through the emitter and collector of transistor Q3 into summing node 29, allowing capacitor C2 to quickly discharge and thereby rapidly release the towed vehicle brakes, as described in greater detail hereinafter.

The triple-slope integrator stage 16 also includes a variable-impedance gain control for controller 10, including diode D2, diode D3, resistor R10, and resistor R11. When the brake system is not activated, the anode of diode D2 is at the potential of conductor 28, which is a 5 volt regulated voltage at output pin 8, since there is no current draw through resistors R8 and R7. Diodes D2 and D3 will thus have a sufficient voltage thereacross to be forward-biased and they will subtract 1.2 volts from the voltage at the anode of potentiometer R8. When forward biased, the diodes effectively short resistor R10. The remainder of the voltage at the cathode of diode D3 drives summing node 29 through resistor R11. Resistor R10 may be a 100 KOhm resistor and resistor R11 may be a 51 KOhm resistor. The voltage at the anode of diode D2 drops quickly below a threshold level which is sufficient to hold diodes D2 and D3 in a current conduction state. Thus, the diodes are reverse-biased, and resistor R10 is connected in series with resistor R11. Diodes D2 and D3 thus act as a threshold switch for controlling the impedance between the anode of diode D2 and the cathode of diode D3.

Integrated circuit U1 is utilized as a comparatively simple pulse-width modulator and may be implemented by the use of the commercial IC No. 3843, manufactured by Unitrode. As utilized in the present application, the inverting input of an internal error amplifier (pin 2) is coupled to summing node 29. Current flows through the potentiometer wiper arm R8, resistor R10 or diodes D2 and D3, and resistor R11 into pin 2 of integrated circuit U1. A resistor R14 and a capacitor C4 are connected between pin 2 and floating ground 30. The junction 34 of resistor R14 and capacitor C4 is connected to output pin 6 by a series connection of resistors R16 and R17. The junction 33 of resistor R16 and resistor R17 is connected to the anode of a diode D6, the cathode of which is connected to supply conductor 28. Diode D6 thus clamps the voltage at junction 33 to a level equal to the voltage on the conductor 28 plus the voltage drop across the diode, i.e., approximately 5.6 volts above floating ground conductor 30, 26. The voltage across resistor R17 is thus dependent upon the voltage on pin 6, such that a current is input to resistor R16 which is proportional to the output voltage at pin 6. Capacitor C4 averages the signal at junction 34, and thus generates a DC signal proportional to the average signal at pin 6. That is, the voltage on capacitor C4 will vary from 0 to 5.6 volts depending upon the duty cycle of the signals on pin 6. Resistor R14 injects a current into pin 2 proportional to the voltage at junction 34. Those skilled in the art will thus recognize that potentiometer RS, resistor R10, diode D2, diode D3, resistor R11, and resistor R14 set the gain of the internal amplifier or U1. An output of the internal error amplifier is provided at pin 1, which is connected to the inverting input pin 2 through a series connection of resistor R13 and a capacitor C2, connected in parallel with diode D5. Capacitor C2, resistor R13, and diode D5 are the feedback path for the internal error amplifier. Resistor R13 sets the high frequency gain of the error amplifier and diode D5 clamps the negative swing of the error amplifier. A capacitor C5 and a resistor R15 are connected between pin 2 and pin 4 of integrated circuit U1. Resistor R15 and capacitor C5 are selected to provide slope compensation, as discussed further hereinafter. Resistor R15 may be a 22 KOhm resistor and capacitor C5 may be a 4.7 uF capacitor.

Pin 4 is a control input for an internal oscillator of integrated circuit U1, which provides timed pulses for the pulse-width modulation, the duty cycle of which must be held below a maximum threshold in order to prevent capacitor C8 from totally discharging during braking. A resistor R18 and a capacitor C7 are selected to form an internal saw-tooth oscillator which has a duty cycle set by the values of these elements. For example, C7 may be selected to be 0.27 uF capacitor and R18 may be selected to be a 22 KOhm resistor. Integrated circuit U1 includes an output pin 8 providing a regulated voltage which is 5 volts above pin 5. Pin 5 is connected to the floating ground 30, 26. Power is supplied to integrated circuit U1 through pin 7. The primary output from integrated circuit U1 appears at pin 6 thereof and this is coupled to the gate of MOSFET elements Q4 and Q5 via resistors R20 and R21, respectively. Output pin 6 is also connected via diode D8 to input pin 3 of integrated circuit U1. A capacitor C6 is connected between input pin 3 and floating ground to act as an integrator which keeps voltage spikes off pin 3. A diode D9 is reverse-biased to isolate pin 3 from the 12 volt battery supply when output pin 6 is low. Pin 3 is a current sense input for a second internal comparator in integrated circuit U1. The output of the latter comparator is used to limit the pulse width of signals at the primary output pin 6, which connects to supply pin 7 or to floating ground 30 to generate output pulses at this pin.

The upper portion 10 of the circuit preferably includes an N-channel MOSFET device, whose use in this environment is accomplished, in the embodiment under consideration, by the use of a floating ground "flying" power supply which, in effect, doubles the available voltage level so as to make it possible to use N-channel MOSFET devices as output stage Q4, Q5, for example by the use of the commercially available N-channel device identified as No. SMP50N05. The diode D7, connected in series with capacitor C8, provides the necessary "pull-up" circuit. As illustrated, diode D7 and capacitor C8 are connected across output stage Q4, Q5 and between the 12 volts of supply 40 and floating ground 30, the latter in fact providing excitation appearing on output conductor 26 noted previously, leading to the brake-actuation of electromagnets L1.

Accordingly, where the preferred N-channel MOSFET devices are utilized, the operational parameters encountered in typical vehicle trailer environments require the pull-up "flying" supply which in effect doubles the available voltage level to provide above-rail drive to the MOSFET gate. In the circuit configuration shown in FIG. 1, the MOSFET gate supply is referenced to the voltage applied to supply conductor 40, but at a level which is effectively increased through the operation of capacitor C8 and diode D7, which are series-connected to supply line 40. Thus, when output stage MOSFET elements Q4, Q5 are non-conducting, capacitor C8 charges to the level present on conductor 40 through diode D23, through a charge path which includes the brake magnet coils L1. When the output MOSFET Q4 is turned on and conducts, the supply effectively rises with the source because diode D7 then allows a positive terminal of capacitor C8 to "boot strap" up to a value of twice the applied voltage. Since the gate drive for output MOSFET elements Q4, Q5 is supplied from pin 7 to pin 6 of IC U1 and then through resistors R20 and R21, the foregoing charge state of capacitor C8 causes the corresponding supply condition to be present as gate drive. Of course, other voltage doubling circuits are known and could be used, but most others utilize more expensive components, e.g., transformers, etc., and under the circumstances present in the use of the circuit under discussion, the logically switched "floating" supply concept works well for the intended purpose.

In order to preclude capacitor C8 from fully discharging, and thereby losing drive, the duty cycle should be set to a level slightly less than full cycle, to insure time for capacitor recharge during the output MOSFET off time. Accordingly, it will be observed that capacitor C8, which serves to boost the operating level of the entire control circuit to a level essentially twice that of the voltage on 40 actually supplied, recharges through the tow vehicle ground circuit, i.e., through the brake magnets, since when the brake-energizing line 26 is driven in a negative direction, capacitor C8 initially receives a current pulse from floating ground conduct 30. When the cycle ends, the polarity across diode D7 causes this supply level to continue to increase. Accordingly, the inductive load L1 comprising the brake-actuation electromagnetic coils functions to provide a constant current flow which is a function of the "duty cycle" of the applied pulse, i.e., the pulse-width. The duty cycle control, in turn, is set up through resistor R18 and capacitor C7, which are coupled between pins 8, 4, and 5 of the pulse width modulator U1, the output from the PWM pin 6 being applied through diode D8 to pin 3. When the output on pin 6 provides a gate drive signal to MOSFET elements Q4, Q5, diode D9 will be forward-biased to provide an indication of the braking current supplied to actuate the brakes. Thus, the circuit operates to inject current into pin 3 of the pulse-width modulator U1 to indicate when the duty cycle exceeds the selected level, and thus reduces the pulse-width from the PWM stage.

When diode D9 is forward-biased by output pin 6 going high, pin 3 of the PWM in effect senses the voltage across output MOSFET Q4 (minus the diode drop across diode D9). That sensed voltage level is proportional to the current flow through the brake-actuating inductor L1. As current is supplied to actuate the brakes by MOSFET Q4, Q5, the signal on pin 3 will ramp up until it exceeds the selected level which is proportional to the signal on pin 1. Accordingly, the pulse-width modulator U1 will turn off when the current reaches a preset limit, thereby establishing a selected duty cycle which corresponds directly to the level of current flow through the trailer brake electromagnets. If the internal oscillator of U1 times out before pin 3 exceeds the signal threshold set by the output on pin 1, the output will turn off to insure that capacitor C8 discharges. Such turn-off provides short-circuit protection of the brake magnet actuation line, as the signal at pin 3 will reach the threshold set by pin 1 rapidly, thereby limiting the pulse width at pin 6.

Additional protection is provided by Zener diodes DZ2 and DZ3. If the circuit is not properly grounded (at the cathode of diode D10), current in brake magnets L1 will charge capacitor C9 through diode D10 such that the voltage at conductor 40 will increase. When the voltage on conductor 40 exceeds the breakdown voltage of Zener diode DZ3, i.e., 16 volts, MOSFET Q4 turns on and dissipates the energy stored in the brake magnets. A cathode of a Zener diode DZ2 is also connected to the cathode of diode D7. The anode of diode DZ2 is connected to junction 31. If the reverse breakdown voltage of diode DZ2 is exceeded due to improper grounding of the controller, the voltage is fed back to potentiometer R8 to limit the pulse width at output pin 6.

The voltage across MOSFET element Q4 is applied to display circuit 12, which preferably includes red and green LEDs LD1 connected back-to-back and physically located directly adjacent one another. The display circuit also includes an LED bar graph driver U2, which may be a commercially available component identified by No. LM3914, which includes an internal voltage divider and a set of ten comparators. As the voltage across MOSFET elements Q4 and Q5 increases during their operating cycle, in proportion to the current flow through the brake magnet coils, the bar graph driver will progressively energize one after another of the LEDs which it controls (identified in FIG. 1 as LD2, LD3, etc). The red/green LEDs LD1 provide a color output which progressively changes in proportion to the current through the brake coils. The operation of the red/green LED and the bar graph driver U2 is described in greater detail in co-pending patent application Ser. No. 07/563,505, and U.S. Pat. No. 5,050,937, the disclosure of which is incorporated herein by reference.

To briefly summarize the embodiment illustrated in FIG. 1 of the drawings, the initiation of braking current to the electric brake magnet coil L1 occurs in response to either inertial sensing or manual control, and comprises current pulses which occur at varying duty cycles, but at a predetermined constant frequency, selected to complement that of the vehicle braking system. The duty cycle of the brake-actuation current pulses is a function of the magnitude of the control signal, i.e., either the magnitude of the braking inertia sensed or the magnitude of the signal produced by actuation of the manual control. At the same time, however, the maximum possible duty cycle is established at a level which protects the circuit components, in particular, the output MOSFETs Q4 and Q5.

The magnitude of the control signal applied to the output stage Q4, Q5 is dependent upon the current through diode D1, which is selected by using switch S1 to connect one or another of resistors R3, R4, and R5 to the emitter of transistor Q1. Switch SW1 is, in effect, utilized to select the rate at which the maximum current applied to actuate the brakes is reached as the signal received by transistor Q2 is dependent upon the magnitude of the current through diode D1. Potentiometer R8 is used to set the maximum current applied to the brake actuator.

Additionally, the gain of the control circuit is set by the resistors R10, R11, and R14 and diodes D2 and D3. When braking is initiated, diodes D2 and D3 short resistor R10, such that the impedance between the anode of diode D2 and pin 2 of integrated circuit U1 is effectively the resistance provided by resistor R11. Shortly after braking is initiated, the voltage across diodes D2 and D3 is less than the forward voltage of both such diodes, and thus these diodes are reverse-biased while resistor R10 is connected in series with resistor R11. The gain for the internal error amplifier of U1 is proportional to the ratio of the resistance between the anode of diode D2 and pin 2 and the resistance of resistor R14. Since the combined resistance of resistors R10 and R11 is approximately equal to the resistance of resistor R14, the gain of the error amplifier is approximately unity when diodes D2 and D3 are reverse-biased. This gain is substantially higher when these diodes are forward-biased, as R14 is significantly larger than resistor R11. Since the rate at which the pulse width of the output signals is increased is proportional to the gain of the internal error amplifier of U1, the effective current magnitude applied to the brake magnet coils will increase rapidly when the diodes involved are forward-biased. Shortly after braking is initiated, diodes D2 and D3 will be reverse-biased, and the current magnitude input to pin 2 is thus set by resistors R10, R11 and R14, such that the effective current applied to the electronic brake shoe actuators increases slowly. When SW2 or transistor Q1 no longer indicate that braking is desired, (i.e., switch SW2 is open or transistor Q1 is not conducting current) capacitor C2 will discharge rapidly due to current injected into the node 29 through transistor Q3. Accordingly, the span between zero brake current being applied to the brake magnet coils and maximum brake current being applied is increased over prior art systems without compromising response time of the electronic controller to brake-actuation signals.

Figure 2:
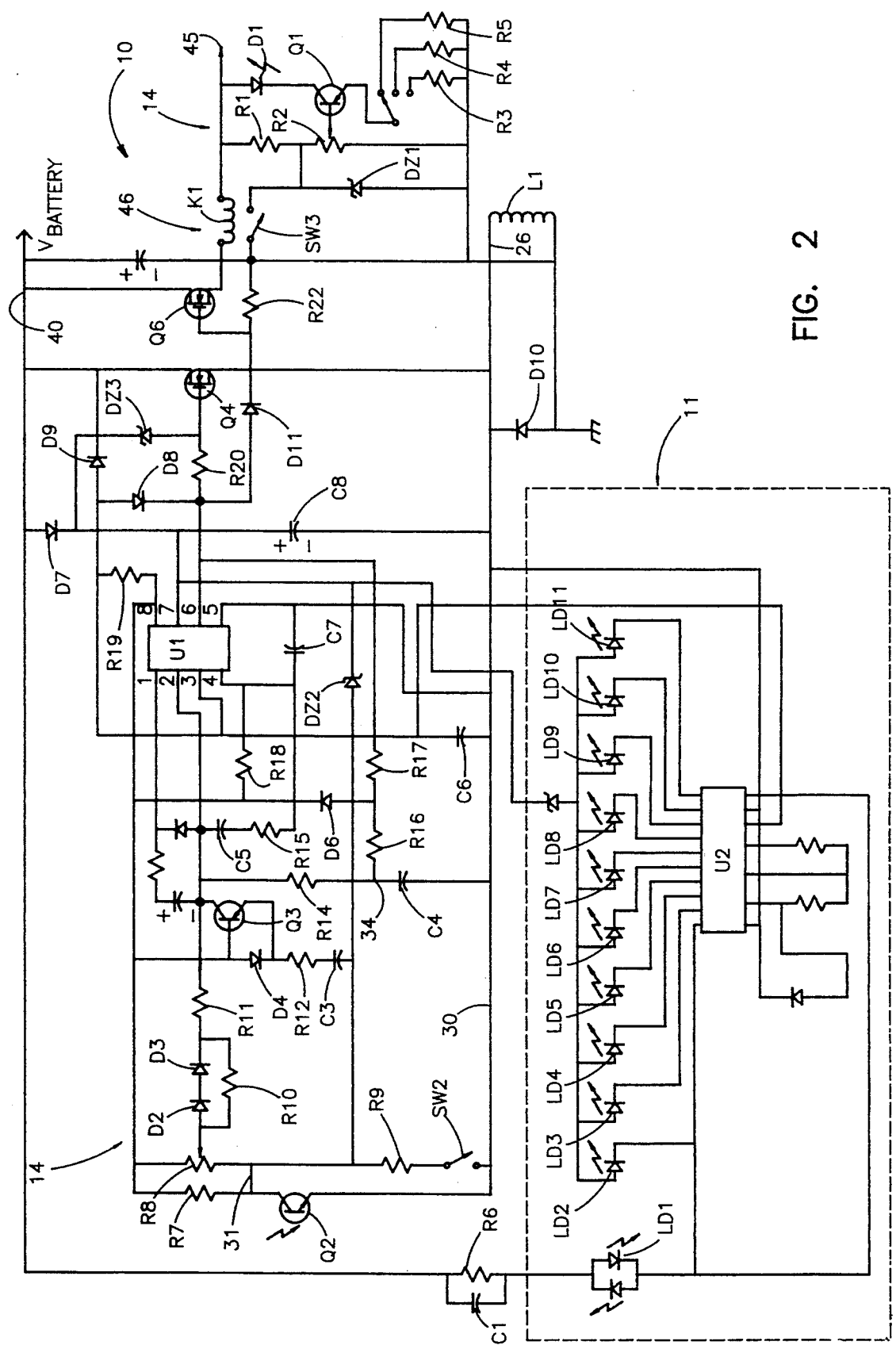
FIG. 2 is a schematic diagram showing a second embodiment of an electronic controller in accordance with the invention.

The circuit of FIG. 2 differs from that of FIG. 1 in that the input stage 14 is connected to a control conductor 45 and includes a regeneration-prevention stage 46 for the manual controller. In a preferred embodiment of this form of the invention, conductor 45 is connected to a stoplight actuation conductor of the towed vehicle. However, the conductor could be connected to any control lead providing high or low logic levels thereon, such as a switch that selectively produces high and low logic levels. The brake-actuation portion of the control circuit of FIG. 2 is substantially identical to that of the circuit of FIG. 1, and accordingly the common components need not be described again with reference to FIG. 2. The regeneration prevention stage 46 includes a MOSFET element Q6, the gate of which is connected to pin 6 of integrated circuit U1 through a diode D11 for receiving the gate drive signal from output pin 6. MOSFET element Q6 may be a commercially available N-channel device identified by #SMP50N05. The gate of MOSFET Q6 is connected to ground through a resistor R22. The source of MOSFET Q6 is connected to relay coil K1, which is a very small inductor comprising, for example six loops of number ten wire. A relay switch SW3 (e.g., a magnetic reed relay) is connected through potentiometer R2 to ground. When switch SW2 is closed while the brake lights are not actuated, MOSFET element Q6 will be turned "on" thereby connecting coil K1 between supply conductor 40 and the stoplight circuit conductor 45. The relay coil K1 accordingly has a current flow therethrough which creates a field effective to close switch SW3. When switch SW3 is closed, both terminals of potentiometer R2 are effectively connected to ground. This turns transistor Q1 "off." Accordingly, no current will flow through diode D1, effectively disabling the inertial sensor Q2. Diode D10 prevents the gate capacitor of MOSFET element Q6 from discharging through resistor R10, such that this MOSFET element will not change conductive states during brake activation. If conductor 45 is activated during normal brakelight-energizing operation, current will not flow through coil K1 since the voltage on conductor 45 is close to that of battery conductor 40. Accordingly switch SW1 will remain open and transistor Q1 will continue to supply current to diode D1. Thus, it can be seen that the regeneration device just described disables the inertial sensor and it s corresponding mode of brake-actuation when conductor 45 is not in a normal energized state, which prevents regenerative braking that could occur in response to brief manual braking effects caused by operation of switch SW2. Accordingly, where conductor 45 is connected to a stoplight actuation conductor, the inertial sensor cannot initiate braking in response to manual actuation of the braking system (using switch SW2) unless the towing vehicle brake lights are activated, as during intentional braking of such vehicle. Conductor 45 may alternately be connected to a switch (not shown) for allowing a vehicle operator to selectively disable the inertial sensor.

It is to be understood that the foregoing description of the preferred embodiments of the invention is provided for purposes of description and illustration, and not as a measure of the invention, whose scope is to be defined by reference to the ensuing claims. Thus, those skilled in the art may devise embodiments of the particular concepts presented in the foregoing illustrative disclosure which differ from the particular embodiments shown and described in detail herein or may make various changes and structural details to the illustrated embodiments. Accordingly, all such alternative or modified embodiments which utilize the underlying concepts of the invention and incorporate the spirit thereof are to be considered as within the scope of the claims appended hereinbelow, unless such claims, by their language, specifically state otherwise.

The embodiments of the invention in which an exclusive property or privilege is claimed are defined as follows.

1. An electronic controller for electrically actuated brakes of the type having means for producing control signals which are proportionally representative of the extent of vehicle braking desired, said means for producing control signals including a means for generating an input signal, said input signal generating means including an inertial sensor having an input and an output, and said electronic controller further having a brake actuation controller coupled to said means for producing control signals for receiving said control signals therefrom, said brake actuation controller responsive to said control signals for energizing and actuating said vehicle brakes with a current signal proportionally representative of the magnitude of said control signals, the improvement comprising a first control means coupled to said input of said inertial sensor for adjusting the magnitude of a current applied to said input of said inertial sensor, said first control means accessible to the vehicle operator during normal operation of the vehicle whereby the vehicle operator adjusts said first current control means to adjust the current supplied to said inertial sensor to compensate for different trailer weights, and a second control means coupled to said input of said inertial sensor, said second control means accessible to the vehicle operator during normal operation of the vehicle whereby the vehicle operator adjusts the second control means to adjust the rate at which the current is applied to the towed vehicle brakes.

2. The electronic controller as defined in claim 1, further including a potentiometer for adjusting a gain of said brake actuation controller.

3. The electronic controller as defined in claim 1, further including a third control means connected to the input of said inertial sensor for adjusting the gain f said means for generating an input signal.

4. The electronic controller as defined in claim 1, wherein said first control means includes a variable impedance means.

5. The controller as defined in claim 4, wherein said first control means includes a switch for selectively connecting one of a plurality of impedances to said input device of said inertial sensor.

6. The controller as defined in claim 5, wherein said inertial sensor includes a light emitting diode coupled to said input.

7. The controller as defined in claim 6, further including a transistor connected in series with said light emitting diode.

8. In an electronic controller for electrically actuated vehicle brakes of the type having means for producing control signals proportionally representative of the desired extent of vehicle braking, said means for producing control signals including an inertial sensor having an input and an output, and means coupled to said output of said inertial sensor for producing pulses of current whose effective magnitude is proportional to the magnitude of said control signals for correspondingly energizing said vehicle brakes, the improvement comprising means for selectively disabling said inertial sensor during normal operation of the vehicle, said means for selectively disabling including a switch coupled t said inertial sensor to selectively disable said inertial sensor, and said means for selectively disabling adapted to be connected to the towed vehicle brakes and to a towing vehicle stoplight conductor, whereby said means or disabling is coupled to the towed vehicle brakes and the towing vehicle stoplight conductor and said means or disabling is responsive to towed vehicle brake actuation when the towing vehicle stoplights are not energized to control said switch to disable said inertial sensor.

9. The electronic controller as defined in claim 8, wherein said inertial sensor includes at least one electronic component and said inertial sensor is disabled by preventing said at least one electronic components from outputting a signal.

10. The electronic controller as defined in claim 8, further including a transistor, said inertial sensor coupled to said transistor such that said transistor controls the flow of current through said inertial sensor and wherein said switch is coupled to said transistor, said switch control selectively controlled to control said transistor to be in a nonconductive state to disable said inertial sensor.

11. The electronic controller as defined in claim 8, further including a driver for outputting brake energizing current to the towed vehicle brakes, wherein said disabling means is coupled to said driver and said towing vehicle stoplight conductor.

12. The electronic controller as defined in claim 11, wherein said switch includes a relay having a relay coil and a relay switch, said relay coil coupled to said driver and said stoplight conductor whereby a current flowing through said relay coil closes said relay switch when the drier supplies brake current and said towing vehicle stoplights are not actuated.

13. The electronic controller as defined in claim 8, wherein said switch includes a first terminal coupled to said inertial sensor and a second terminal coupled to ground, whereby said switch is closed to disable said inertial sensor.

* * * * *

UNITED STATES PATENT AND TRADEMARK OFFICE
CERTIFICATE OF CORRECTION

PATENT NO. : 5,352,028

DATED : October 4, 1994

INVENTOR(S) : Larry Eccleston, Marshall, Mich.

It is certified that error appears in the above-indentified patent and that said Letters Patent is hereby corrected as shown below:

Column 4, line 18
  "he circuit" should be --the circuit--.

Column 4, line 25
  "he output" should be --the output--.

Column 4, line 29
  "here" should be --there--.

Column 5, line 5
  "capacitor" should be --Capacitor--.

Column 6, line 39
  "RS" should be --R8--.

Column 10, line 56
  "it s" should be --its--.

Column 11, line 55, claim 3
  "gain f" should be --gain of--.

UNITED STATES PATENT AND TRADEMARK OFFICE
CERTIFICATE OF CORRECTION

PATENT NO. : 5,352,028
DATED : October 4, 1994
INVENTOR(S) : Larry Eccleston, Marshall, Mich.

It is certified that error appears in the above-indentified patent and that said Letters Patent is hereby corrected as shown below:

Column 12, line 22, claim 8
        "t said" should be --to said--.

Column 12, line 26, claim 8
        "means or" should be --means for--.

Column 12, line 28, claim 8
        "means or" should be --means for--.

Column 12, line 55, claim 12
        "drier" should be --driver--.

Signed and Sealed this

Fourth Day of July, 1995

Attest:

BRUCE LEHMAN

Attesting Officer    Commissioner of Patents and Trademarks